Dec. 31, 1968    W. R. SCHERB, JR    3,418,712

PROCESS FOR MANUFACTURING RELAYS

Filed April 29, 1963    Sheet 1 of 6

INVENTOR
W.R. SCHERB Jr.
BY
ATTORNEY

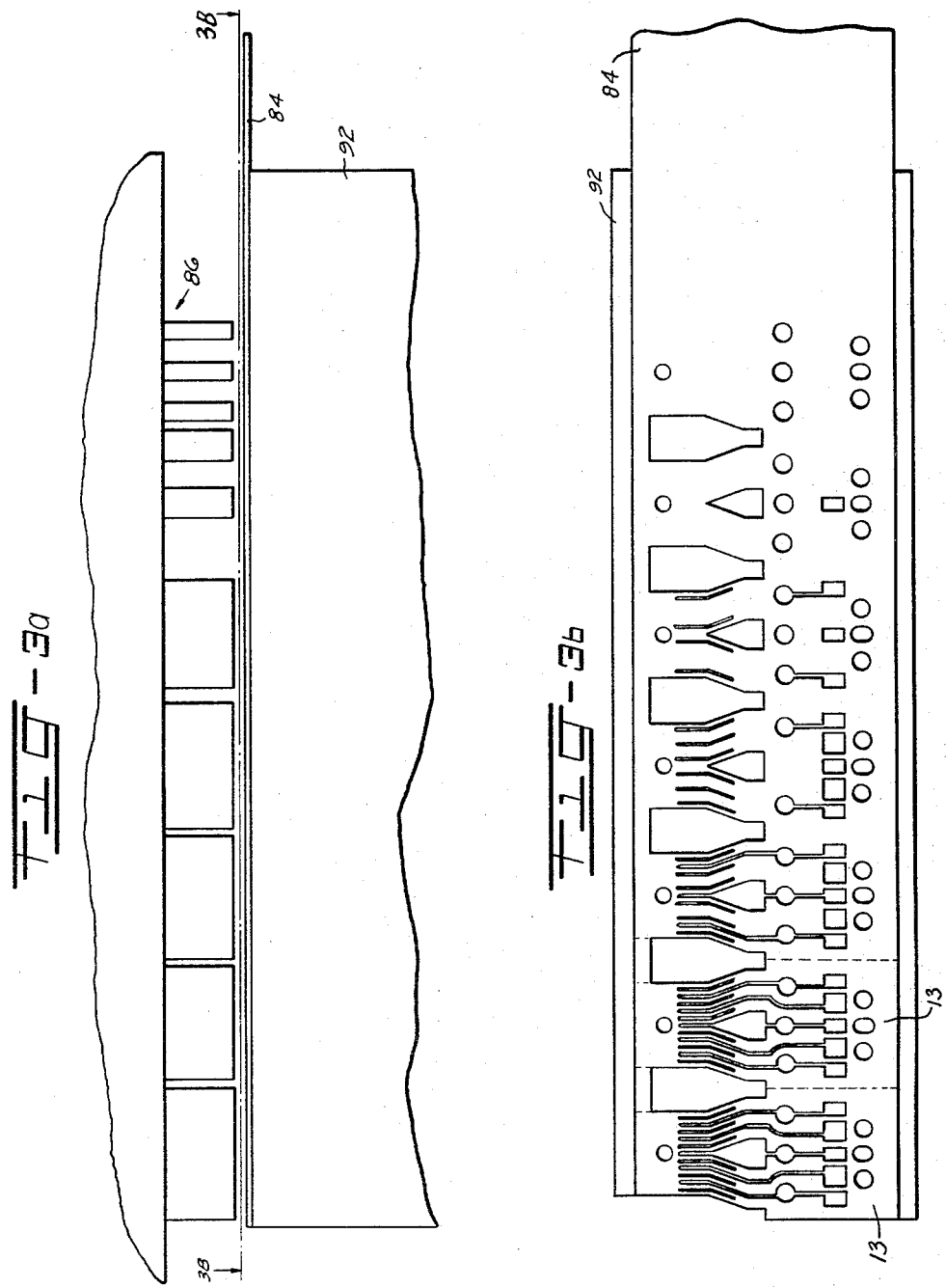

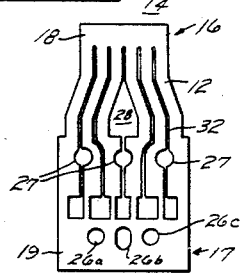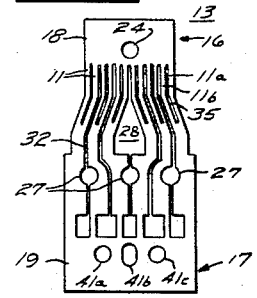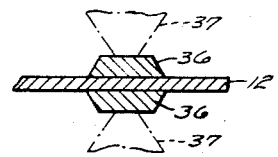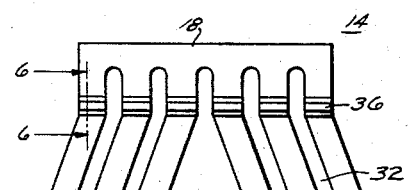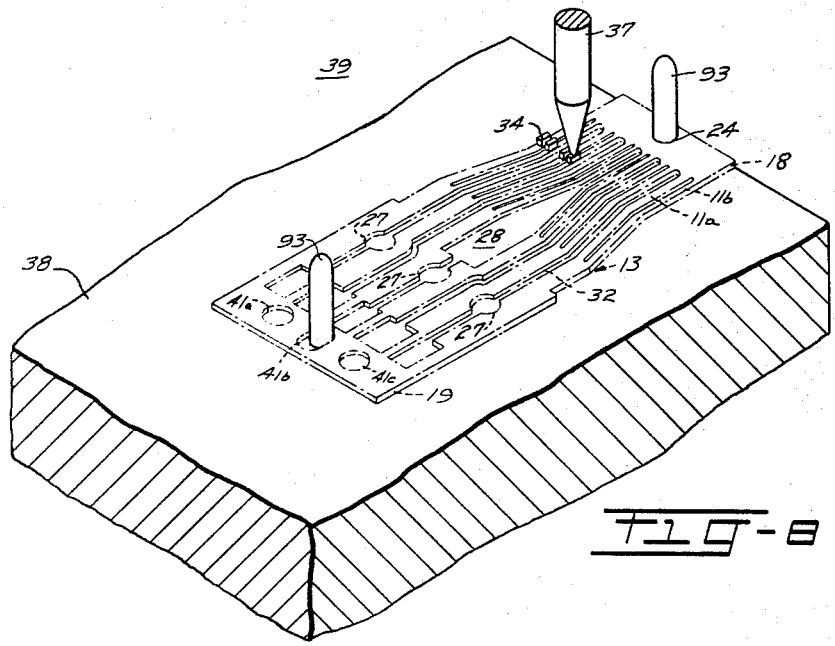

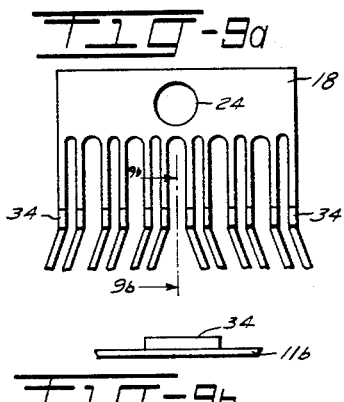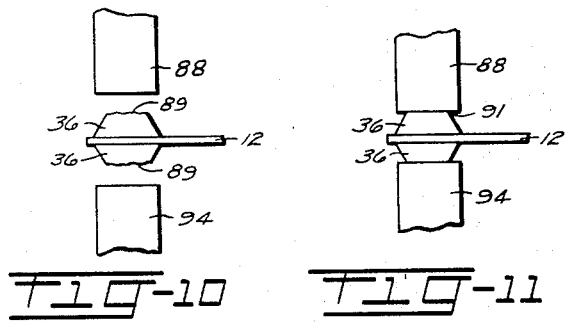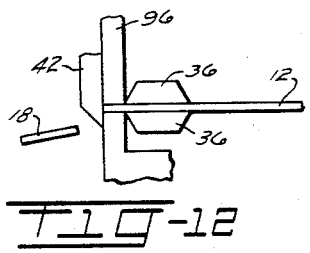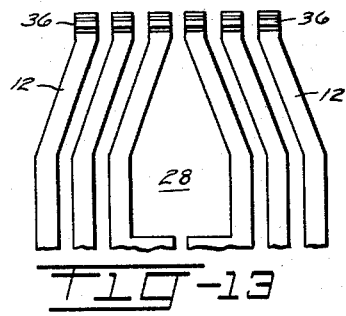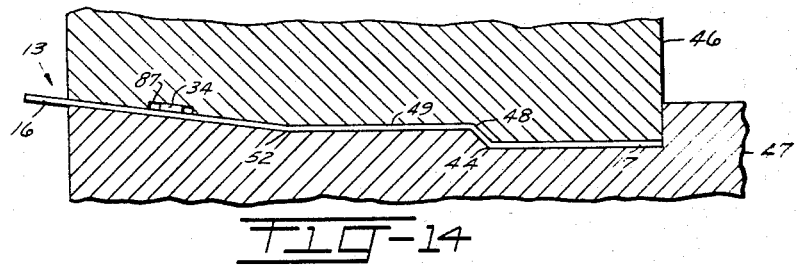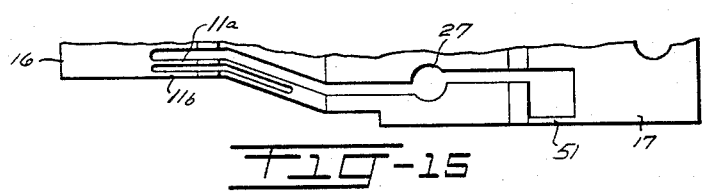

Dec. 31, 1968  W. R. SCHERB, JR  3,418,712
PROCESS FOR MANUFACTURING RELAYS
Filed April 29, 1963  Sheet 5 of 6
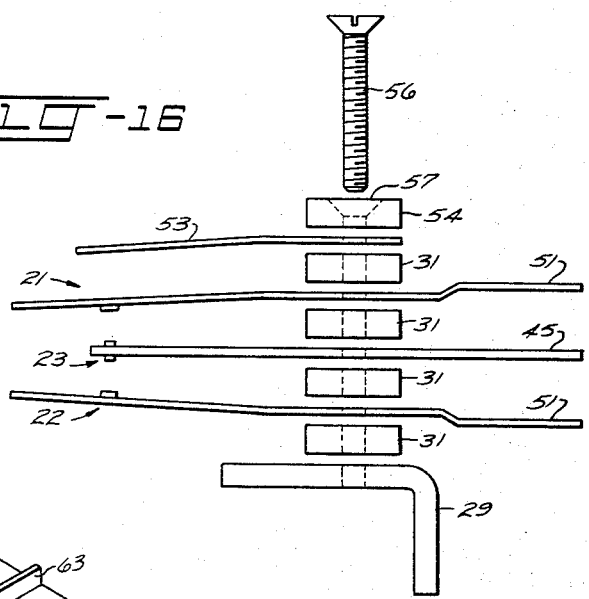
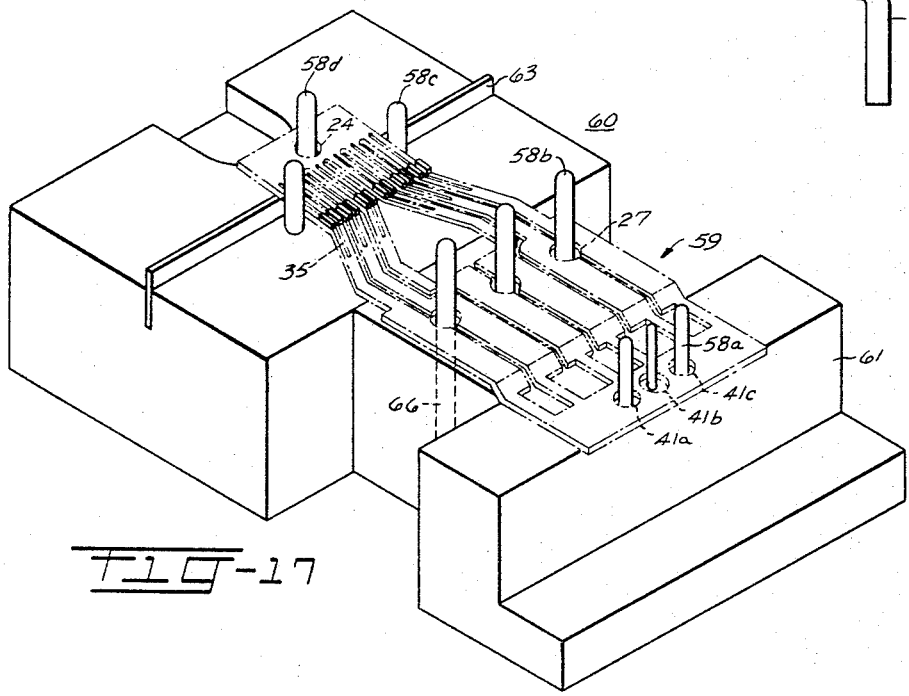
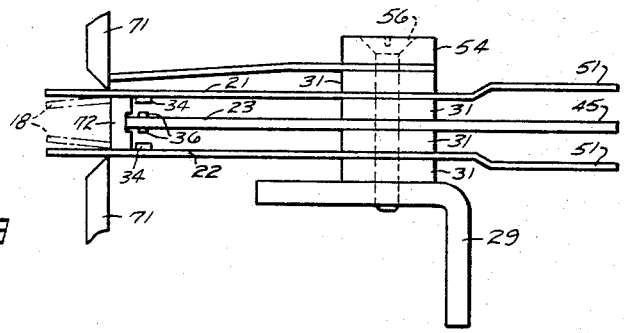

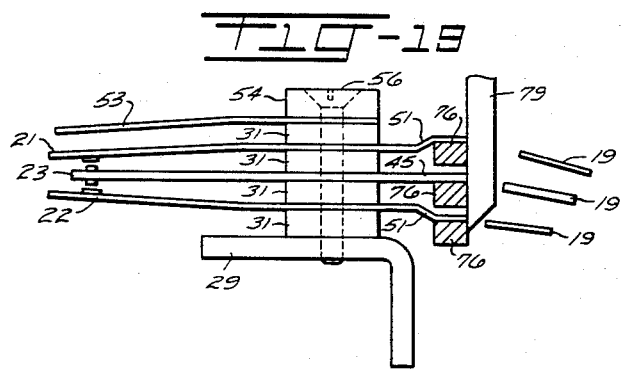
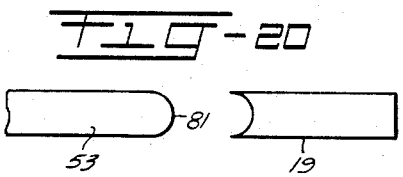
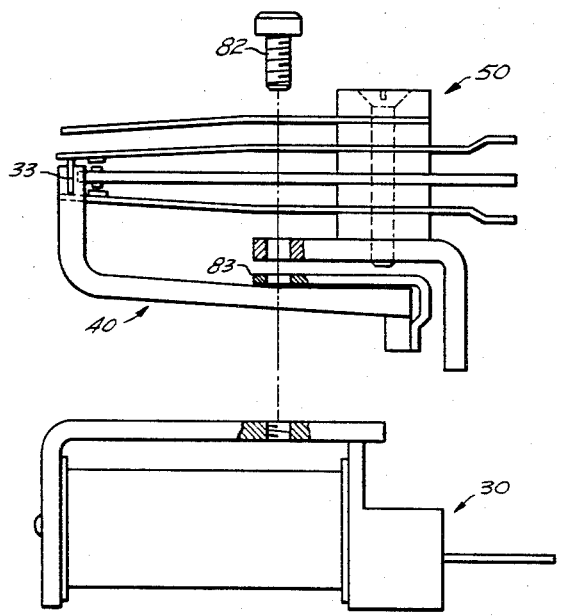

United States Patent Office 3,418,712
Patented Dec. 31, 1968

3,418,712
PROCESS FOR MANUFACTURING RELAYS
Walter R. Scherb, Jr., South Plainfield, N.J., assignor to Western Electric Company Incorporated, New York, N.Y., a corporation of New York
Filed Apr. 29, 1963, Ser. No. 276,334
4 Claims. (Cl. 29—622)

ABSTRACT OF THE DISCLOSURE

A method of manufacturing relays, especially miniature relays, wherein the springs are blanked on a strip in card form and intermediate connecting webs at opposite ends of the springs, which are provided with locating holes, facilitate the handling of the parts. After the contacts are welded thereon, the springs are assembled into a pile-up and the connecting webs are removed, except for one connecting web, which is removed earlier in the process. The pile-up is mounted together with the armature and the coil in the final relay assembly.

---

This invention relates to electromechanical relays and particularly to miniature electromechanical relays and a method of manufacturing them.

The industry-wide attempt to reduce the size and increase the reliability of communications equipment, especially equipment located on customers premises which is costly to repair or replace, has led to development in the electrical component field. As a result of such efforts in the relay art, a much smaller and lighter relay has been designed to perform the functions of relatively larger relays, such as the wire spring relay shown in U.S. Patent 2,682,585, in many diverse switching applications. While possessing similar performance capabilities for many applications, the new miniature relay is only about one-tenth the size of a wire spring relay. As a further advantage, the miniature relay is highly compatible with new equipment designs and may, by way of illustration, be mounted directly onto printed wiring boards for incorporation into a compact circuit.

To be economically competitive, however, a relay must be manufacturable at low cost and in large numbers without excessive assembly time and expense. New techniques of manufacture and a considerable amount of development were required to produce a miniature relay because of the rather small and delicate individual parts, especially the springs, which are not by their nature suited for mass production. This invention, however, proposes to assemble miniaturized relay pile-ups with the springs arranged in integral groups, thereby maintaining the proper tolerances and minimizing the handling of parts. Subsequently, the individual springs are separated from one another in order to perform their predetermined operative function. As a further advantage, miniature relay subassemblies and springs may be readily located in position for automatic machine operations such as contact welding, forming, etc. By applying the process of this invention, a miniature relay with precise dimensional requirements may be produced at a rapid pace with a low unit cost.

One object of the invention is a method of economically assembling a plurality of small parts in a precise dimensional relationship.

Another object of the invention is to produce a miniature relay in a novel and expeditious manner.

Another object of the invention is a method of assembling miniature relays using webbed piece parts to facilitate the handling of individual parts during a variety of manufacturing operations.

A more specific object of the invention is a miniature electromechanical relay and a method of making same wherein the relay springs are processed and assembled to pile-ups in integral groups in order to maintain the spaced relationship of parts and specified tolerances affecting the electrical operation of the relay.

According to one embodiment of the invention, a new type of miniature electromechanical relay includes four or six sets of electromechanically actuated contact springs arranged in two layers with an intermediate layer of transfer springs. The basic relay structure is the end-on armature type, an efficient magnetic design. Since the individual parts, such as the springs of a miniature relay are necessarily small and in some cases quite frail, under conventional assembly techniques, these parts would necessarily be handled individually with tweezers, some parts would be distorted and the assembly process would be costly. The labor factor would more than outweigh the advantages of small size and weight and it would also be difficult to produce a relay meeting high standards of performance and reliability. Manifestly, working with huge quantities of these individual small parts, it would be a difficult task to achieve the accuracies in alignment and location needed both in manufacture and in operation of the relay.

In a typical relay of the proposed type, the pile-up, as previously mentioned, includes three layers of springs: the middle layer is composed of relatively stiff stationary springs while the top and bottom layers are movable flexible springs of a very light gauge metal. During manufacture, the four or six springs ordinarily comprising a layer are partially punched from thin coil or strip stock with connecting webs at each end. These springs, which are grouped in card form with webbed end portions, are processed and assembled as a unit achieving a considerable labor savings. This design also lends itself to automatic manufacture so that further economies are possible.

Accurately placed holes are perforated in the connecting webbed portions during the punching operation in order to assist in locating and aligning the springs in all subsequent operations, such as contact welding or pretension forming. In addition, the holes are used for locating the springs during the final assembly of the pile-up on its mounting bracket. After the completion of the pile-up assembly, the excess connecting and locating web portions of the spring blanks are clipped off. In this manner, not only are fewer and larger parts handled, but all location and alignment relationships are directly established from the same datum positions. With the amount of handling decreased, the chance of defects entering into the relay is decreased and product reliability enhanced correspondingly.

These and other objects and advantages will become more apparent when considered in conjunction with the accompanying drawings, wherein:

FIG. 3a illustrates a typical method of producing miniature relay spring cards;

FIG. 3b is a top view taken along the line 3b—3b of FIG. 3a which shows the progressive formation of spring cards;

FIG. 4 shows a group of relay transfer springs in card form;

FIG. 5 shows a group of relay contact springs in card form;

FIG. 6 is a sectional view of a contact welding operation taken along the line 6—6 of FIG. 7 showing the welding electrodes in phantom;

FIG. 7 shows an exploded top view of the contact portion of a transfer spring card;

FIG. 8 shows a contact spring card positioned in a nest for contact welding;

FIG. 9a shows an exploded top view of the contact portion of a contact spring card;

FIG. 9b is a view of a transfer spring contact taken along the line 9b—9b of FIG. 9a;

FIG. 10 shows a transfer spring contact in position for bumping;

FIG. 11 illustrates a typical bumping operation being performed on transfer springs;

FIG. 12 illustrates a clipping operation performed on a group of transfer springs;

FIG. 13 is a partial top view of a group of transfer springs after clipping;

FIG. 14 is a side view depicting the forming of a plurality of miniaturized relay springs in card form;

FIG. 15 is a partial top view of a formed contact spring card;

FIG. 16 illustrates the relay pile-up assembly operation;

FIG. 17 shows a relay pile-up assembly fixture with a contact spring card in position;

FIG. 18 illustrates the clipping of the webbed contact portion of the contact springs in a relay pile-up;

FIG. 19 illustrates the clipping of the terminal portion of a pile-up assembly;

FIG. 20 illustrates the shaping of terminal ends by the forming cutters; and

FIG. 21 illustrates a final assembly operation wherein separate relay subassemblies are combined to form a finished product.

Figures 1, 2:
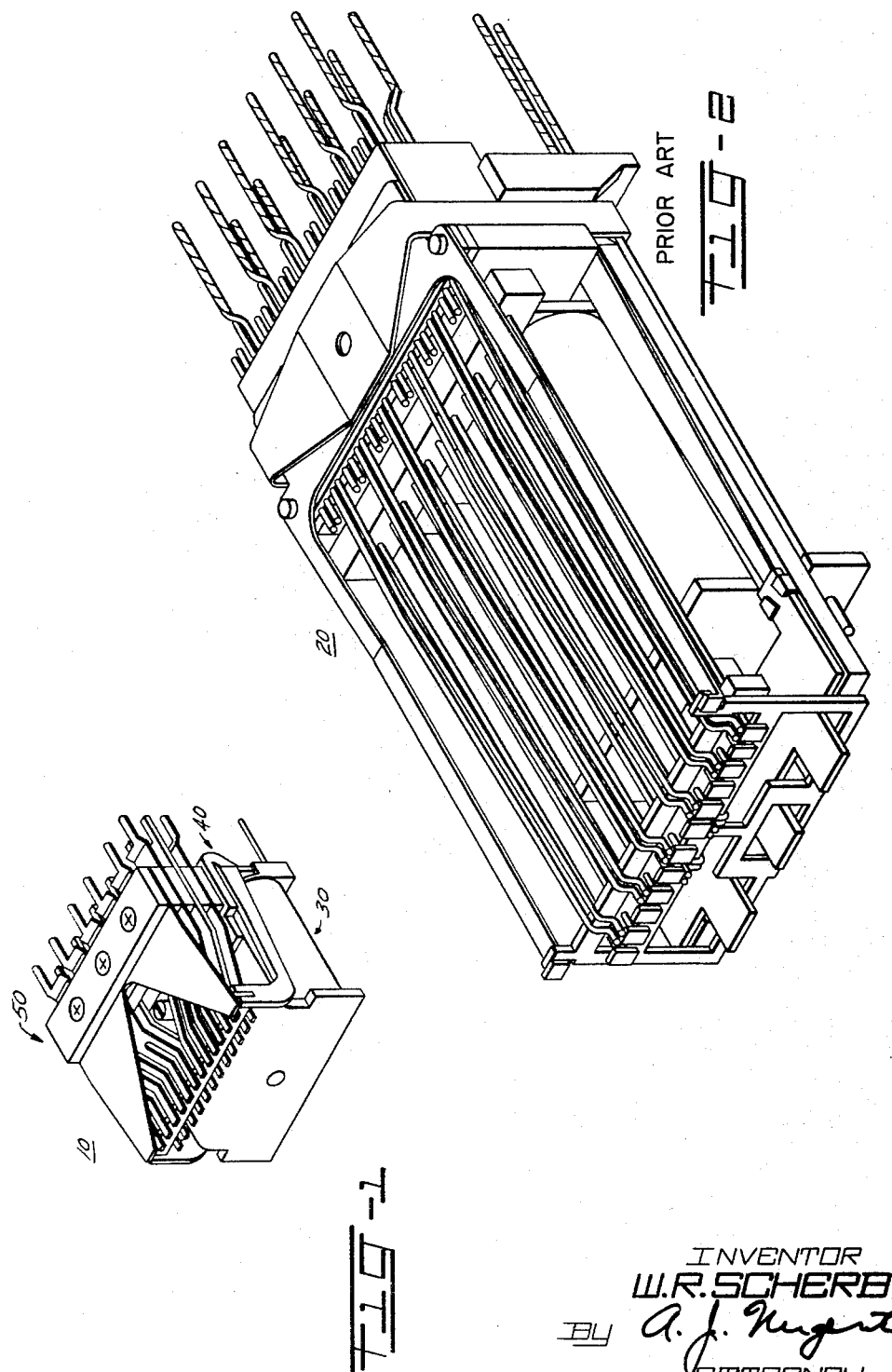
FIG. 1 is a view of a complete miniature relay assembly.
FIG. 2 is a view of a wire spring relay.

With reference to the drawings, FIG. 1 illustrates a typical miniaturized relay 10 which is capable of performing many of the functions of a wire spring relay 20 shown in FIG. 2 and is about one-tenth the size of the wire spring relay 20. Approximate overall dimensions of a typical miniaturized relay 10 having four sets of springs are 1¼₁₆ x ⅞ x 1¼ inches with various piece parts held to accuracies within a thousandth of an inch or even less. A relay 10 having four sets of springs would be even smaller than the miniature relay 10 shown in FIG. 1 which has six sets of springs. The relay assembly is basically an end-on armature type of design comprising a coil assembly 30, an armature and hinge spring assembly 40 and a pile-up assembly 50 (FIG. 21). The parts comprising the relay assembly will be described in detail in conjunction with a description of the manufacturing process illustrated in FIGS. 3 through 21.

Since reduction in the size of parts renders handling and positioning problems more difficult, this invention proposes to process the relay springs 11 and 12 of a particular layer in the relay pile-up 50 as an integral unit or card 13 and 14, FIGS. 4 and 5. Accordingly, as illustrated in FIGS. 3a and 3b, the contact spring card 13 is precision punched from coil or sheet stock 84 in a rapid machine operation involving a progressive punch 86 and die 92 of conventional design. FIG. 3b shows the punching sequence which produces finished contact spring cards 13. The transfer cards 14 are fabricated in a similar manner.

Processing a number of springs 11 or 12 together achieves time-saving economies and maintains the precise dimensional tolerances necessary for satisfactory relay operation. Accordingly, four or six sets of relay springs 11 and 12 are processed and assembled together with their respective contact and terminal ends 16 and 17 joined by connecting webs 18 and 19. At this point, the springs may be said to be embryonic since their fabrication is not complete until the webbed end portions are severed. The webbed portions 18 and 19 advantageously add a degree of support to the rather frail and delicate springs 11 and 12 which are punched from thin metal stock in an intricate pattern. Situated in the webbed portions 18 and 19 are a number of locating and positioning holes (described hereinafter) which serve to locate the springs 11 and 12 properly for various machine operations and to position the springs 11 and 12 with respect to one another during assembly.

A typical miniature relay 10 includes three layers of springs, two layers of contact springs 21 and 22 and an intermediate layer of transfer springs 23 (FIG. 16). The transfer springs 12 are approximately four times the thickness of the contact springs 11 and remain stationary during the operation of the relay 10 while the flexible contact springs 11 make and break contact therewith. The transfer spring card 14 is further distinguished by having locating holes 26a, b and c in only the terminal end 17 of the spring card 14 while the contact spring card 13 includes a centrally positioned hole 24 on the contact end 16 as well as terminal end locating holes 41a, b and c. Both spring cards 13 and 14 have a series of intermediate holes 27 for pile-up assembly purposes and a central aperture 28 to permit final assembly to a relay bracket 29, as will be described later. A series of elongated slots 32 separate the individual springs 11 and 12.

The relay pile-up 50, FIG. 16, is built up with layers 21, 22 and 23 of flat springs 11 and 12 and insulators 31, a method which avoids the expense and long manufacturing preparation time associated in the past with molded pile-ups. Twin contact springs 11a and 11b, separated by a slot 35, are provided to insure contact reliability and as a further design feature, the pile-up 50 is actuated by card 33 which provides additional assurance against contact locking. The contacts 34 and 36 on the contact and transfer springs 11 and 12 respectively, see FIGS. 6 and 9b, are formed of materials such as palladium, with a thin surface layer of gold over the palladium of the moving twin contacts 34.

Certain advantages of the unique process of this invention are clearly illustrated in FIG. 8 wherein the contact springs 11 are contact welded as a unit with one or more contacts 34 being welded at the same time. Only a single locating operation is required to accurately position each set of springs 13 beneath the welding electrode 37 and this operation is aided by the precisely located holes in the webbed portions 18 and 19. FIG. 8 shows a contact spring card 13 positioned in a nest 38 by means of protruding elements 93 of a welding apparatus 39 adapted for automatic feed. Not only is it much faster feeding cards to a welding station on an automatic machine but once the card 13 or 14 is positioned properly, each contact 34 or 36 is accurately located with respect to the electrode 37. The transfer spring 12, as shown in FIGS. 6 and 7, is provided with welded contacts 36 on both sides while the contact springs 11, FIGS. 9a and 9b, are provided with contacts 34 on only one side. Of course, contacts may be selectively welded on the springs 11 and 12 depending upon the circuit function the relay 10 is to perform. A bumping operation, FIGS. 10 and 11, may be incorporated with the welding operation to properly size the welded contacts 36 on the transfer springs 12. In such cases, a bumping tool 88 would flatten any rough edges or burrs 89 on the contact 36 against an anvil 94 leaving a smooth surface 91.

The transfer spring card 14 is subjected to a clipping operation, shown in FIG. 12, where the webbed contact portion 18 is removed, the line of severance being just beyond the welded contacts 36. A standard clipping arrangement may be used wherein one or possibly two cutters 42 are brought into contact with the card 14 which is fixedly held by elements 96. An exploded view of the separated springs 12 as they appear after clipping is depicted in FIG. 13.

The contact spring card 13 undergoes a forming operation where the springs 11 are formed into a desired configuration by a cooperating punch 46 and die 47, see FIGS. 14 and 15. The terminal portions 17 are bent at point 48 away from the spring plane 49 and at point 44 so that the terminals 51 extend in substantially a parallel relation with respect to the plane 49. This operation spreads the terminals 51 of the contact springs 11 away from the transfer spring terminals 45 (FIG. 16) to facilitate making terminal connections and it also provides a more secure arrangement where the relays 10 are mounted directly on printed wiring boards, etc. The contact portion 16 is bent at 52 to provide the required spring pressure for relay operation at predetermined current values. Any necessary contact bumping is integrated with the forming operation at 87.

The spring pile-up 30 is then assembled as illustrated in FIG. 16 on the fixture of FIG. 17. The miniaturized relay pile-up 50 comprises basically a layer of transfer springs 23 usually including about four to six individual springs 12, situated between two layers 21 and 22 of movable contact springs 11 and separated therefrom by insulators 31. The outer piece parts of the pile-up assembly comprise a bracket 29 on one end and a return spring 53 and clamp plate 54 on the other end, both isolated from the contact springs 11 by insulating members 31. The pile-up 50 is held together by one or more screws 56 which are placed through holes 57 in the clamp plate 54, return spring 53 and insulators 31 and then threaded into the bracket 29. The spring cards 13 and 14 are designed so that the openings 27 in the spring cards are larger than the screw holes 57. Consequently, there is no need for a tubular bushing to electrically separate the springs 11 or 12 of a designated layer 21, 22, or 23.

In greater detail, FIG. 17 depicts a pile-up assembly fixture 60 having a plurality of protruding locating elements 58a, b, c and d, a transverse slot 59 to accommodate a relay bracket 29 and an irregular surface configuration 61 which facilitates handling of parts. The three protruding elements 58a at one end are designed to pass through the apertures 26a, b and c and 41a, b and c in the terminal portion 17 of the spring cards 13 and 14 respectively, while the intermediate removable elements 58b are designed to engage apertures 27. A slotted comb-like member 63 extending transversely across the central portion of the fixture 60 clears the slots 35 of contact spring card 13 and locates the transfer spring card 14 side-to-side. Protruding elements 58c are used to guide the return spring 53 during assembly. The single element 58d at the other end of the fixture engages the end aperture 24 in the contact portion 16 of the contact spring card 13.

In one preferred embodiment of the invention, protruding elements 58a and d are approximately .125 inches in diameter while contact spring hole 24 is slightly larger (i.e. .125 inches plus a small increment to permit engagement by 58a and the width dimension of 41b provides a similar fit. Clearance holes 41a and 41c are about .141 inches in diameter. Positioning a contact spring card 13 over element 58d fixes the location of the card but permits rotation about that point. Aperture 41b permits an easy sliding fit over element 58a and prevents rotation about element 58d thereby accurately positioning the card 13 for assembly. The same positioning principles apply as well to the welding operation shown in FIG. 8.

The transfer spring holes 26b and 26c are .141 inches and .125 inches plus respectively. The elongated aperture 26a has a width dimension of .125 inches plus in a transverse direction thereby preventing rotation about fixed hole 26c. The transfer spring card 14 is thereby accurately located with respect to the contact spring card 13.

To assemble the pile-up 50 on the fixture 60 of FIG. 17, removable elements 58b are placed in the holes 66 and the various piece parts, such as return springs 53 and spring cards 13 and 14 placed over the protruding elements 58a, b, c and d in the previously described sequence (FIG. 16). When the pile-up 50 is complete, elements 58b are removed and screws 56 inserted and tightened. In some instances, the completed pile-up 50 might be cleaned ultrasonically to remove dirt and contaminating films resulting from the assembly process.

The completed pile-up 50 is fed to the clipping apparatus shown in FIG. 18 where a pair of vertically opposed cutters 71 clip the webbed portion 18 of the two contact spring layers 21 and 22 in cooperation with an anvil 72, the line of severance being a short distance from contacts 34. The individual springs 11 are thereby freed for movement with respect to the stationary transfer springs 12. A contact force of about 10 grams per pair of twin contacts 34, is normally required for relay operation.

FIG. 19 depicts the succeeding clipping operation wherein the webbed terminal portions 19 of the contact spring and the transfer spring cards 13 and 14, are removed leaving a plurality of protruding terminals 51 and 45 for electrical connections. As shown, the webbed portions 19 are placed through a number of apertures 74 in holding blocks 76 with the excess portion 77 overhanging the outer edge 78 of the blocks 76. A descending cutting blade 79 clips all three spring cards in a single stroke leaving rounded edges 81, FIG. 20, on the terminals 45 and 51.

The final miniature relay assembly operation is depicted in FIG. 21. Here the separate subassemblies such as the coil 30, armature and hinge spring 40 and the spring pile-up 50 are assembled together with a single screw 82 which passes through the aperature 28 in the spring cards 13 and 14 fastening the bracket 29 to the coil mounting 83. Usually a plastic cover (not shown) is placed over the relay for protection purposes.

It is to be understood that the above described arrangements are simply illustrative of the principles of the invention. Other arrangements may be readily devices by those skilled in the art which will embody the principles of the invention and fall within the spirit and scope thereof.

What is claimed is:

1. A method of producing a miniature relay which includes the steps of:
  blanking a predetermined number of relay contact and transfer springs from sheet stock in card form with opposite ends of each card including a connecting web and perforating one or more locating holes in the webbed portions of the contact springs and in one of the webbed portions of the transfer springs,
  positioning individual cards comprising a number of attached relay springs in a welding nest by means of the locating holes,
  welding contacts on one end of the contact and transfer springs,
  bumping said contacts to remove burrs,
  bending one or more cards of contact springs in a predetermined configuration,
  clipping the webbed contact end of a transfer spring card,
  assembling a relay pile-up with the springs in card form by precisely locating a plurality of contact and transfer springs with respect to one another by means of the locating holes,
  clipping one of the webbed ends of the contact springs to separate the individual springs,
  clipping the other end of the contact and transfer springs, and
  completing the assembly by mounting an armature and hinge spring assembly and a coil assembly to the relay pile-up.

2. A method in accordance with claim 1 wherein:
  the relay pile-up is assembled over protruding nest elements, the spring cards being placed over said elements in a sliding fit permitted by oval locating holes in the contact and transfer spring cards.

3. The method of producing relays which includes the steps of:
  blanking a predetermined number of relay contact and transfer springs from sheet stock in card form with opposite ends of each card including a connecting web,
  perforating a plurality of locating holes in the cards,
  feeding the cards to a welding station, welding contacts on one end portion of the contact and transfer springs of the cards,
sizing the contacts,
forming the cards of contact springs into a predetermined configuration,
clipping one of the connecting webs of the transfer cards,
assembling a relay pile-up insulating spacers by precisely locating a pair of contact cards, and an intermediate transfer card with respect to one another by means of the locating holes,
clipping one of the connecting webs of the contact cards of the pile-up,
clipping the other connecting webs of the contact and transfer cards of the pile-up to separate the individual springs, and
mounting together the relay pile-up so assembled, an armature assembly, and a coil assembly.

4. The method of producing relays in accordance with claim 3 comprising:
positioning the cards at the welding station by means of the locating holes.

References Cited

UNITED STATES PATENTS

| | | | |
|---|---|---|---|
| 1,905,690 | 4/1933 | Doyle | 29—630 XR |
| 2,838,111 | 6/1958 | Boltus | 83—925 XR |
| 2,802,971 | 8/1957 | Leeuen | 200—166.1 XR |
| 2,970,896 | 2/1961 | Cornelison et al. | |
| 3,167,852 | 2/1965 | Stengl | 29—630 XR |
| 3,194,931 | 7/1965 | Pasko et al. | |
| 3,216,089 | 11/1965 | Dettman | 29—626 |
| 2,500,413 | 5/1950 | Horlacher | 200—166.1 XR |
| 2,650,957 | 9/1953 | Cohen | 29—155.55 |
| 2,852,639 | 9/1958 | Nelsen | 29—155.55 |

JOHN F. CAMPBELL, *Primary Examiner.*

U.S. Cl. X.R.

29—624, 628, 630